Feb. 13, 1968   J. W. BOZEK   3,368,680
FILTER WITH ELEMENT SUBASSEMBLY
Filed May 4, 1965   3 Sheets-Sheet 1
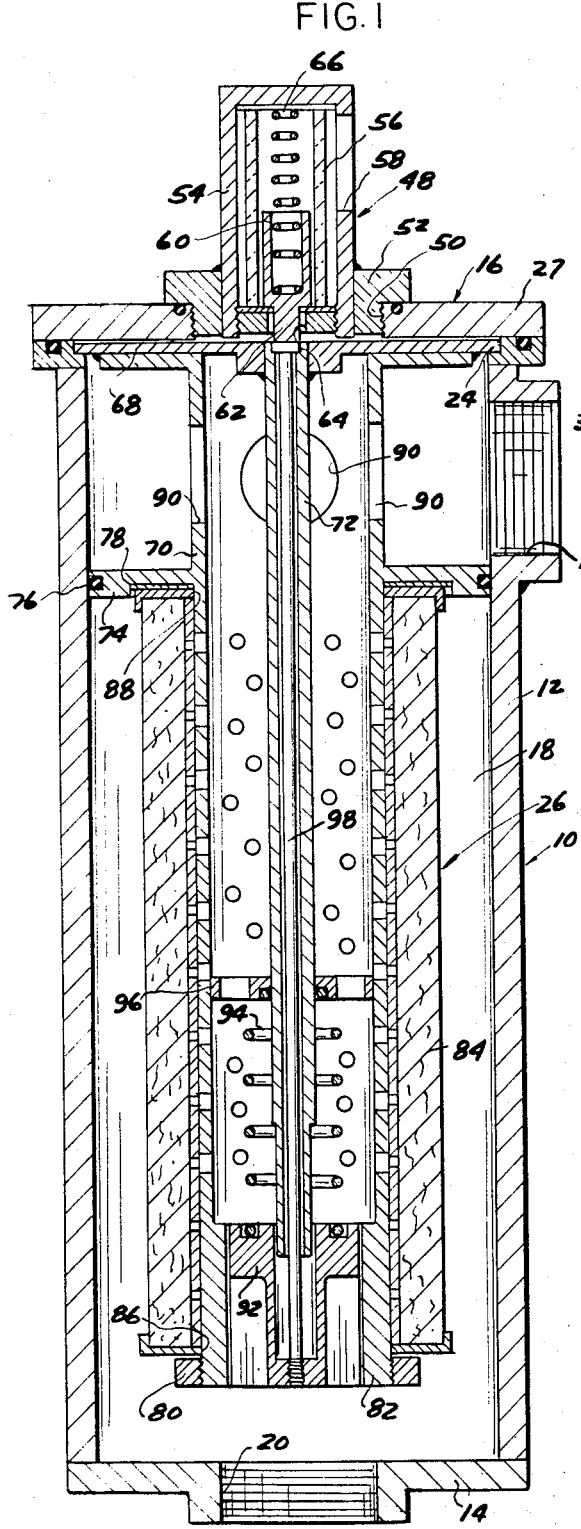
FIG. 1
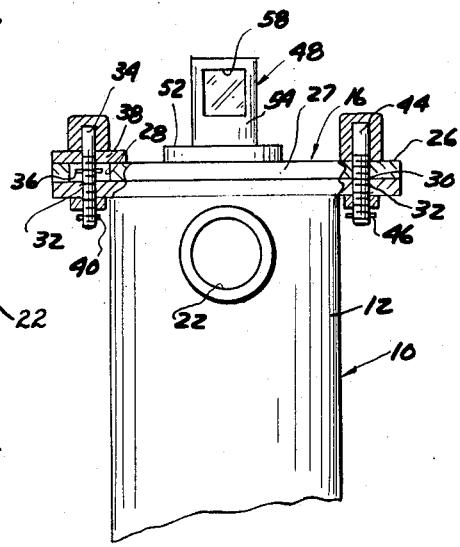
FIG. 2
FIG. 3
INVENTOR
JOHN W. BOZEK
BY *Hauke & Hauke*
ATTORNEY

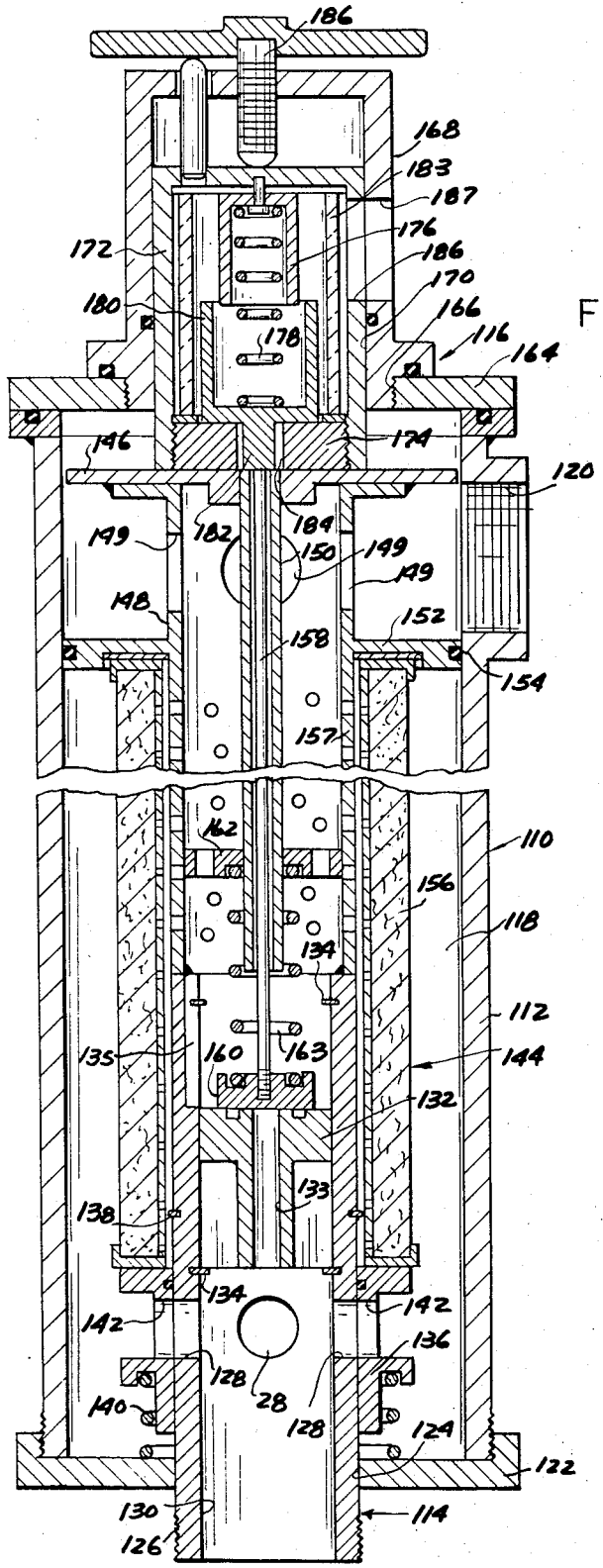
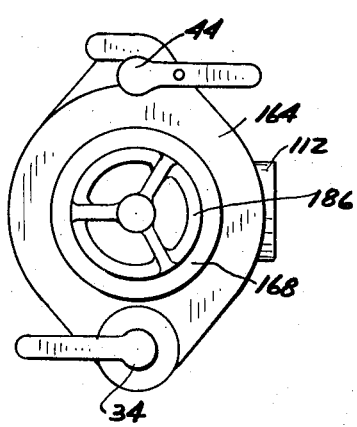
FIG. 4
FIG. 5
INVENTOR
JOHN W. BOZEK
BY Hauke & Hauke
ATTORNEY United States Patent Office 3,368,680
Patented Feb. 13, 1968

3,368,680
FILTER WITH ELEMENT SUBASSEMBLY
John W. Bozek, Waterford, Mich., assignor to The Rosaen Filter Company, Hazel Park, Mich., a corporation of Michigan
Filed May 4, 1965, Ser. No. 452,991
8 Claims. (Cl. 210—90)

ABSTRACT OF THE DISCLOSURE

A filter device including a housing defining a filter chamber and having an inlet and an outlet opening thereto, a cylindrical filter element mounted in the filter chamber with the exterior thereof exposed to fluid from the inlet and the interior connected with the outlet. A bypass valve mechanism is carried in one end of the filter element and normally blocks flow through the end of the element directly from the inlet to the outlet and is operable upon the filter becoming unduly clogged to open and thus bypass the filter element. A rod connects axially with the bypass valve mechanism and extends axially through the filter element and in combination with other mechanism indicates the position of the bypass valve and thus the condition of the element. In one embodiment the rod actuates an indicator which moves in the same axis as the rod and in another embodiment the rod through linkage mechanism actuates the indicator which moves in an axis normal to the axis of the rod. A valve mechanism is provided in one embodiment which closes the inlet upon removal of the filter element and opens the interior of the filter element to the inlet upon removal of the element so that removal will not tend to produce a backwash of the filter element.

---

The present invention relates to fluid filtering systems and more particularly to an improved filter device for such systems incorporating a readily removable filter subassembly.

My copending application Ser. No. 451,758, filed Apr. 29, 1965, discloses an improved filter device in which the filter element is mounted in position by an exteriorly mounted handwheel which is used to urge the filter element into sealing and mounting engagement with a spring biased mounting member. Such a construction provides for ready removal of the filter element from the filter housing for periodic cleaning or replacement.

While the filter device of my aforementioned copending application has proven to be quite satisfactory, the filter device of the present invention provides a considerable improvement over my previously disclosed filter device. This improvement resides in a subassembly construction which is mounted, in several of the preferred embodiments, within the filter housing in a manner similar to that previously disclosed. Unlike my previous filter device however the subassembly includes not only the filter element but also the bypass valve mechanism so that each time the filter subassembly is removed for cleaning or replacement the bypass valve mechanism can be checked and repaired if necessary. Further, by incorporating the filter element and the bypass mechanism in a single subassembly a substantial reduction in manufacturing costs over the heretofore disclosed device can be achieved.

It is an object then of the present invention to facilitate the removal and installation of filter elements and bypass mechanism for filter devices by combining the filter element and the bypass mechanism in a subassembly which is adapted to be mounted within the filter device and by providing means exteriorly of the device for urging the subassembly into a sealed and mounted position.

It is still another object of the present invention to improve the functioning of bypass means for filter devices by incorporating the bypass means within a subassembly which includes the filter element so that each time the element is cleaned or replaced the bypass means can be checked.

It is yet another object of the present invention to reduce the costs of manufacturing filter devices having a filter element and a bypass mechanism by incorporating the filter element and bypass mechanism in a unitary subassembly.

It is yet another object of the present invention to improve filter devices by providing a subassembly for such devices which includes the filter element and a bypass mechanism, and end cap and means exteriorly of the end cap for urging the subassembly into a sealed and mounted position, and an indicating means carried by the end cap and actuated by the bypass mechanism to indicate the condition of the filter element.

Still further objects and advantages of the present invention will readily occur to one skilled in the art to which the invention pertains upon reference to the following drawings in which like reference characters refer to like parts throughout the several views and in which FIG. 1 is a longitudinal cross sectional view of one preferred embodiment of the present invention.

FIG. 2 is a fragmentary elevational view as seen from the right hand side of FIG. 1 with portions shown in cross section for purposes of clarity.

FIG. 3 is a top elevational view of the device in the position illustrated in FIG. 2.

FIG. 4 is a longitudinal cross sectional view of another preferred embodiment of the present invention, FIG. 5 is a top elevational view as seen from the top of FIG. 4.

Figure 6:
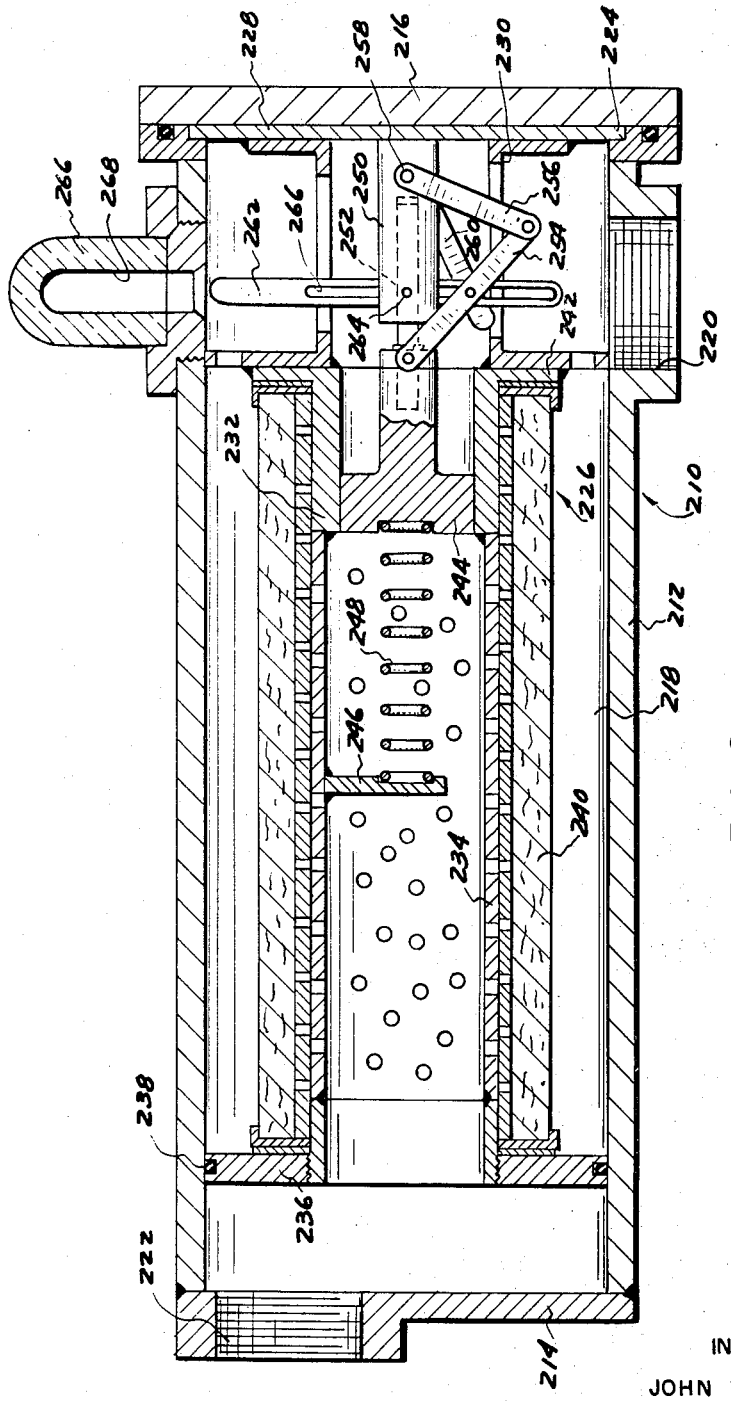
FIG. 6 is a longitudinal cross sectional view of still another preferred filter device of the present invention.

Now referring to the drawings for a more detailed description of the present invention, FIGS. 1–3 illustrate one preferred filter device 10 as comprising a substantially cylindrical housing member 12. The housing member 12 is closed at one end by a plate portion 14 and at the opposite end by an end cap assembly 16 to define a filter chamber 18. The housing member is provided with an inlet 20 and an outlet 22 opening to the filter chamber 18.

The upper end of the housing member 12 is provided with an annular recess 24 which provides the means in combination with the end cap assembly 16 for mounting a filter subassembly 26 within the filter chamber 18.

The end cap assembly 16 comprises a plate member 27 which as can best be seen in FIG. 2 is provided with oppositely positioned through holes 28 and 30 which register with internally threaded through holes 32 provided in the housing member 12. The registering holes 28 and 32 receive a screw member 34 and the hole 28 is of an enlarged diameter to receive a radially enlarged portion 36 of the screw member 34. A perforated plate 38 secured to the plate member 27 raises the plate member 27 so that it will clear the top of the housing member 12. The registering holes 28 and 32 receive a screw member 34 and the hole 28 is of an enlarged diameter to receive a radially enlarged portion 36 of the screw member 34. A perforated plate 38 secured to the plate member 27 raises the plate member 27 so that it will clear the top of the housing member 12. A cross pin 40 provided in the end of the screw member 34 prevents the screw member from being removed from the housing member 12 so that the end cap assembly 16 and the housing member 12 cannot be separated.

The plate member 27 is provided with a transverse slot 42 which registers with the through hole 30 as can best be seen in FIGS. 2 and 3. A screw member 44 is received by the through hole 30 and the registering threaded hole 32 and a cross pin 46 carried on the end of the screw member member 44 prevents removal of the screw member 44 from the housing member 12.

The end cap assembly 16 further comprises an indicating means 48 carried in a threaded central opening 50 provided in the plate member 27. The indicating means 48 comprises an externally threaded plug 52 adapted to be received by the threaded opening 50. The plug 52 carries a cylindrical member 54 extending upwardly from the plate member 27 and closed at its upper end. A transparent cylindrical insert member 56 is carried by the member 54. The member 54 is provided with a side window 58. An indicator member 60 is axially slidably mounted in the insert member 56 and is provided with a reduced diameter portion 62 which is disposed within an opening 64 provided in the lower end of the cylindrical member 59. A spring 66 urges the reduced diameter portion 62 into the opening 64.

The filter subassembly 26 comprises an upper disc member 68 seated in the recess 24 and carrying an inner tubular member 70 extending axially into the filter chamber 18 and a rod 72 extending axially within the tubular member 70. The tubular member 70 is provided with a radially outwardly extending flange portion 74 engaging the inner wall of the housing member 12 intermediate the inlet 20 and the outlet 22. The flange portion 74 carries an O-ring seal 76 to prevent fluid leakage therepast.

The inlet side of the flange portion 74 is provided with an annular recess 78 which in combination with a nut member 80 received by the externally threaded portion of a valve mounting member 82 provides the means for mounting a substantially cylindrical filter element 84 to the subassembly 26. The valve mounting member 82 is secured to the free end of the tubular member 70 and extends through a central opening 86 provided in the lower end of the filter element 84. The upper end of the filter element 84 is also provided with a central opening 88 which provides communication between the interior of the filter element 84 and the outlet 22 through annularly spaced ports 90 provided in the upper portion of the tubular member 70. The portion of the tubular member 70 adjacent the filter element 84 is provided with a plurality of perforations as shown to permit fluid passage through the filter element 84 to the interior of the tubular member 70.

The rod 72 provides the means for axially slidably positioning a bypass valve member 92 within the valve mounting member 82. A spring 94 biased between a perforated seating ring 96 carried on the interior wall of the tubular member 70 and the bypass valve member 92 urges the valve member to a position closing fluid flow through the interior of the mounting member 82. The rod 72 is hollow and carries a push rod 98 which has one end secured to the valve member 92 and the other end positioned to engage the indicator member 60 through the opening 64 provided in the cylindrical member 54 so that axial movement of the valve member 92 produces a corresponding axial movement of the indicator member 60.

As the filter element 84 of the filter device 10 illustrated in FIGS. 1–3 begins to become clogged the valve member 92 which is subjected on one side to the pressure of the fluid within the filter element 84 and on the other side to pressure on the inlet side of the filter element 84 will begin to move axially against the force of the spring 94. The extent of movement will depend upon the condition of the filter element 84 since the pressure differential across the element will increase in correspondence to the degree to which the element is clogged. Movement of the valve member 92 will be transmitted through the push rod 98 to produce a corresponding axial movement of the indicator member 60 so that the degree of clogging of the filter element 84 will be visibly indicated through the window 58.

As the element 84 continues to become clogged and when the degree of clogging has reached a predetermined value, the valve 92 will have moved axially sufficiently to open a bypass path directly from the inlet 20 through the mounting member 82 and the interior of the tubular member 70 to the outlet 22.

When it is desired to remove the filter element 84 for cleaning or replacement the screw members 34 and 44 are loosened to permit the end cap assembly 16 to be pivoted about the screw member 34 in a clockwise direction as seen in FIG. 3. The slot 42 permits the end cap assembly 16 to be pivoted from engagement with the screw member 44. The screw members 34 and 44 remain fixed to the housing member 12 and the end cap assembly 16 remains fixed to the housing member 12 so that the parts cannot become lost while the filter element 84 is being cleaned or replaced.

The filter subassembly 26 is then removed from the filter housing member 12 and the element 84 is cleaned or replaced.

The bypass valve mechanism is removed as a part of the subassembly 26 and can be checked and replaced if necessary. It is to be noted that where it is not desirable to shut down the system for a time sufficient to replace or clean the element 84 or to repair or clean the bypass valve mechanism a new subassembly 26 can be immediately installed in the housing member 12 to restore the system to operation and the old subassembly 26 can be cleaned or repaired at some later time.

FIGS. 4–5 illustrate another preferred filter device 110 similar to the device described above but in which the provision of an inlet valve means has necessitated some changes in construction.

The filter device 110 preferably comprises a substantially cylindrical housing member 112 having an inlet valve assembly 114 closing one end of the housing member 112 and an end cap assembly 116 closing the opposite end. The housing member 112 defines a filter chamber 118 and an outlet 120 is provided in the housing member 112 in communication with the filter chamber 118.

The inlet valve assembly 114 preferably comprises a cap member 122 screwed on to the end of the housing member 12 and having a central opening 124. A tubular member 126 is fixed to the cap member 122 to extend through the opening 124 into the filter chamber 118. The tubular member 126 is provided with annularly spaced ports 128 and defines an inlet 130 normally connected to the filter chamber 118 through the ports 128. A bypass valve member 132 is axially slidably mounted within the tubular member 126 and is limited in axial movement by a pair of spaced retaining rings 134 disposed above the ports 128. Bypass passages 135 are formed in the interior wall of the tubular member 126 above the valve member 132. An inlet valve member 136 is disposed about the exterior surface of the tubular member 126 and is axially movable therealong to a position in which the upper edge engages a retaining ring 138. A spring 140 urges the inlet valve member 136 toward an upper position and the inlet valve member 136 is provided with a plurality of annularly spaced ports 142 disposed to register with the ports 128 when the inlet valve member 136 is in a lower position.

A filter subassembly generally indicated at 144 is mounted about the upper end of the tubular member 126 and extends upwardly to engage the end cap assembly 116 as will be described in greater detail below. The filter subassembly 144 preferably comprises an upper disc 146 which supports a tubular member 148 and a rod 150. The rod 150 extends axially through the tubular member 148. The tubular member 148 is provided with a radially outwardly extending flange portion 152 which engages the inner wall of the housing member 112. A seal 154 prevents fluid leakage past the flange portion 152. A substantially cylindrical open ended filter element 156 is secured to the flange portion 152 in any convenient manner and extends downwardly therefrom encompassing a perforated portion 157 and the upper portion of the tubular member 126.

The rod 150 is hollow and axially slidably receives a push rod 158. The push rod 158 extends through the free end of the rod 150 and carries at its free end a circular block 160. A ported spring seat member 162 is secured to the interior surface of the tubular member 148 and provides the seat for a spring 163 which urges the block 160 downwardly into engagement with the bypass valve member 132 to close a central passage 133 provided in the bypass valve member 132.

The end cap assembly 116 preferably comprises an end plate member 164 which as can best be seen in FIG. 5 is secured to the housing member 112 by screw members 34 and 44 in the manner described above with reference to FIGS. 1–3. The end plate member 164 is provided with a threaded central opening 166 which receives the externally threaded lower end of a closed top cylindrical member 168. The lower end of the member 168 is provided with an opening 170 which axially slidably receives a closed top inner cylindrical member 172. An externally threaded plug 174 closes the lower end of the inner cylindrical member 172. The inner cylindrical member 172 carries a seat member 176 which provides the seat for one end of a spring 178 urging an indicator member 180 axially downwardly against the plug 174. The indicator member 180 is provided with a reduced diameter portion 182 which extends through an opening 184 provided in the plug 174 to be engaged by the upper end of the push rod 158. A cylindrical insert 183 is carried in the interior of the member 172.

The cylindrical member 168 carries a screw member 186 which engages the top of the inner cylindrical member 172 and which upon rotation either moves the inner cylindrical member 172 axially downwardly or permits the spring biased push rod 158 to move the inner cylindrical member 172 axially upwardly within the opening 170. The insert 183 is preferably transparent and the members 172 and 168 are provided with side windows 186 and 187 which permit the position of the indicator member 180 to be viewed exteriorly of the device. The lower edge of the cylindrical member 172 urges the subassembly 144 into engagement with the spring biased inlet valve member 136 so that the subassembly 144 is carried in a mounted and sealed position within the filter chamber 118. The end of the filter element 156 in engagement with the inlet valve member 136 retains the ports 128 and 142 in registry so that a normally open fluid path is maintained between the inlet 130 and the filter chamber 118.

The bypass valve and indicating means function similarly to the device described above with reference to FIGS. 1–3 with the bypass path being opened through the slots 135 and with the only difference in functioning being produced by the inlet valve member 136. Upon removal of the filter element 156 the valve member 136 is moved upwardly by the spring member 140 to close the ports 128 so that fluid cannot enter or leave the filter chamber 118 through the inlet 130 while the element 156 is not in position.

When the filter element 156 is in an upper position the block member 160 is separated from the by-pass valve member 132. Fluid within and above the element 156 flows out of the housing member 112 by means of the central passage 133 provided in the bypass member 132. Fluid within the fluid chamber 118 passes through the element 156 in the normal direction and then flows out through the central passage 133. Thus fluid empties from the filter element 156 without flowing in a reverse direction through the filter element 156 to dislodge foreign particles accumulated on the inlet side of the element and to return these particles to the fluid system from which they have been removed.

The screw member 186 permits the lower end of the cylindrical member 172 to be adjusted to properly position the subassembly 144 and permits the cylindrical member 172 to be moved upwardly by the subassembly 144 when it is desired to pivot the end cap assembly 116 away from the top of the housing member 112.

FIG. 6 illustrates another preferred embodiment of the present invention especially suitable for horizontal mounting.

The filter device generally indicated at 210 preferably comprises a substantially cylindrical filter housing 212 closed at one end by a plate 214 and at the opposite end by an end cap assembly 216. The filter housing 212 defines a filter chamber 218 and is provided with an inlet 220 opening to the filter chamber 218. The plate 214 is provided with an outlet 222 opening to the chamber 218.

The edge of the housing member 212 adjacent the end cap assembly 216 is provided with an annular recess 224 which provides the means in combination with the end cap assembly 216 for positioning a filter subassembly generally indicated at 226 within the filter chamber 218.

The filter subassembly 226 preferably comprises a disc portion 228 having its peripheral edge carried in the recess 224. The disc portion 228 carries a cylindrical porting member 230 which in turn carries at its free end a cylindrical mounting member 232. A tubular member 234 extends axially from the free end of the mounting member 232 and is externally threaded at its free end to receive a closure disc 236 having an internally threaded central opening. The disc 236 extends radially outwardly into engagement with the inner wall of the housing member 212 and carries an O-ring seal 238 which prevents fluid leakage between the disc 236 and the housing member 212. A substantially cylindrical open ended filter element 240 is sandwiched between the disc 236 and a flanged portion 242 formed on the mounting member 232. The tubular member 234 is perforated as shown to permit fluid passage through the filter element 240 and into the interior of the tubular member 234.

The mounting member 232 carries a bypass valve member 244 which normally blocks one end of the filter element 240. A spring seat 246 is secured to the interior of the tubular member 234 and carries a spring 248 which urges the bypass valve to a closed position.

The disc portion 228 also carries a rod 250. The rod 250 axially slidably carries a push rod 252 which has the free end secured to the bypass valve member 244 so that axial movement of the bypass valve member 244 produces axial movement of the push rod 252 within the rod 250. A link member 254 is pivotally secured to the end of the push rod 252 adjacent the bypass valve 244. The opposite end of the link 254 is pivotally secured to a second link member 256 which is in turn pivotally secured at its free end to the rod 250 by a pin 258. A third link 260 is carried by the pin 258 so that pivotal movement of the link 256 also produces pivotal movement of the link 260.

An elongated indicator member 262 is carried at a right angle to the rod 250 and is axially movably secured thereto by a pin 264 which extends through an axial slot 266. The free end of the link 260 is pivotally secured within the slot 266 so that pivotal movement of the link 260 produces axial movement of the indicator member 262. A transparent indicator viewer structure 266 is carried by the housing member 212 and is provided with an internal recess 268 for receiving the free end of the indicator member 262.

It is apparent that the filter device 210 of FIG. 6 operates similarly to the devices described above. The bypass valve member 244 is actuated in response to changes in the pressure differential across the filter element 240 and produces an axial positioning of the indicator member 262 through the push rod 252 and the link members 254, 256 and 260 which corresponds with the axial position of the bypass valve member 244.

Like the embodiments described above the entire filter subassembly 226 can be readily removed for cleaning or replacement of the filter element 240.

It is apparent that although I have described but several embodiments of my invention many other changes and modifications can be made therein without departing from the spirit of the invention as expressed by the appended claims.

I claim:
1. A filter device comprising:
    (a) a housing member defining a filter chamber and having an inlet and an outlet registering with said filter chamber,
    (b) a filter element and means supporting said filter element in said filter chamber intermediate said inlet and said outlet,
    (c) an end cap adapted to close said filter chamber and means pivotally connecting said end cap to said housing for pivotal movement toward and away from a position closing said filter chamber,
    (d) means carried by said housing member for locking said end cap to said housing member in said closed position of said end cap,
    (e) a tubular member extending into said filter chamber at the end opposite said end cap and defining said inlet, said tubular member having a plurality of ports to provide communication between said inlet and said filter chamber, a cylindrical valve member slidably disposed over said tubular member and including ports which in one axial position of said valve member register with said tubular member ports, biasing means urging said valve member toward a position in which said ports are not in registry and therefore said tubular ports are closed by said valve member, and the end of said filter element engaging said valve member upon insertion of said filter element into said filter chamber to urge said tubular member toward a position in which said ports are in registry,
    (f) bypass valve means disposed within the end of said filter element adjacent said tubular member and biasing means normally urging said bypass valve means toward a position blocking fluid flow from said inlet to the interior of said filter element, and including pressure responsive means urging said bypass valve means to a position opening flow from said inlet to the interior of said filter element upon the pressure differential across said filter element increasing to a predetermined value.

2. The filter device as defined in claim 1 and in which said end cap includes indicating means actuated by said bypass valve means to indicate the position thereof.

3. The filter device as defined in claim 1 and in which said bypass means includes a passage communicating said inlet with the interior of said filter element, and means carried by said filter element closing said passage when said filter element is in place within said filter chamber but opening said passage upon removal of said filter element from said filter chamber.

4. The filter device as defined in claim 1 and including a rod extending axially from said bypass valve means through the interior of said filter element and axially movable upon axial movement of said bypass valve means and indicating means carried on the free end of said rod and movable therewith to indicate the position of said bypass valve means and to therefore indicate the condition of said filter element.

5. A filter device comprising:
    (a) a housing member defining a filter chamber and having an inlet and an outlet opening to said chamber,
    (b) a filter subassembly and means positioning said subassembly within said filter chamber, intermediate said inlet and said outlet,
    (c) said subassembly comprising a substantially cylindrical, open ended filter element having an exterior and interior communicating respectively with said inlet and said outlet, and bypass valve means positioned within one end of said filter element and normally closing fluid flow from the exterior of said filter element through the end thereof and into the interior of said filter element,
    (d) pressure responsive means operable to urge said bypass valve means toward a position opening a fluid path through the interior of said filter element from said inlet to said outlet upon a predetermined increase in the pressure differential across said filter element, indicating means actuated by said bypass valve means to indicate the position of said valve means and to thereby indicate the condition of said filter element, and
    (e) said indicating means comprising a rod extending axially through said filter chamber and said filter element, means urging said rod into engagement with said valve means to be movable axially therewith, an indicator member carried at the free end of said rod and means transmitting movement of said rod to produce a corresponding movement of said indicator member.

6. The filter device as defined in claim 5 and including
    (a) an inlet valve means carried in said inlet,
    (b) means urging said inlet valve means toward a position closing fluid flow through said inlet, and
    (c) said filter subassembly being provided with means engaging said inlet valve means when said subassembly is mounted in said filter chamber and urging said inlet valve means to a position opening fluid flow through said inlet.

7. The device as defined in claim 5 and including a cap assembly disposed above said filter element, said indicator member including a cylindrical member axially movable within said cap assembly and means urging said cylindrical member into engagement with the free end of said rod whereby said cylindrical member moves axially with said rod, and means provided in said cap assembly for viewing the position of said cylindrical member.

8. A filter device comprising:
    (a) a housing member defining a filter chamber and having an inlet and an outlet open to said chamber,
    (b) a filter subassembly and means positioning said subassembly within said filter chamber, intermediate said inlet and said outlet,
    (c) said subassembly comprising a substantially cylindrical, open ended filter element having an exterior and interior communicating respectively with said inlet and said outlet, and a bypass valve mounted within one end of said filter element and operable in a closed position to close fluid flow from the inlet of said device through the end of said filter element to the interior thereof, and pressure responsive means operable upon an increase in the pressure differential across said filter element to move said bypass valve means to a position opening the inlet side of said filter element to the interior of said filter element, and
    (d) indicating means for visually indicating the position of said bypass valve means comprising a rod extending axially into said filter chamber and said filter element, means urging one end of said rod into engagement with said bypass valve means whereby movement of said bypass valve means produces a corresponding axial movement of said rod, an indicator member carried in a position to be viewed exteriorly of said housing and means transmitting movement of said rod to produce a corresponding movement of said indicator member, said transmitting means including link members connecting said rod and said indicator to translate axial movement of said rod to movement of said indicator in a linear direction substantially normal to the direction of movement of said rod.

References Cited

UNITED STATES PATENTS

| | | | |
|---|---|---|---|
| 2,544,244 | 3/1951 | Vokes | 210—234 |
| 2,793,752 | 5/1957 | Jay | 210—234 X |
| 2,982,413 | 5/1961 | Kraissl | 210—131 |
| 3,150,633 | 9/1964 | Holl | 210—90 X |
| 3,161,589 | 12/1964 | Burckhalter | 210—232 X |
| 3,291,307 | 12/1966 | Rosaen | 210—90 |

SAMIH N. ZAHARNA, *Primary Examiner.*